United States Patent
Pan

(10) Patent No.: US 7,049,882 B2
(45) Date of Patent: May 23, 2006

(54) TRANSMITTER IF SECTION AND METHOD ENABLING IF OUTPUT SIGNAL AMPLITUDE THAT IS LESS SENSITIVE TO PROCESS, VOLTAGE, AND TEMPERATURE

(75) Inventor: Meng-An Pan, Cerritos, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/769,900

(22) Filed: Feb. 3, 2004

(65) Prior Publication Data

US 2005/0168268 A1  Aug. 4, 2005

(51) Int. Cl.
*G05F 1/10* (2006.01)
*G05F 3/02* (2006.01)

(52) U.S. Cl. .................... 327/543; 455/114.2; 455/295

(58) Field of Classification Search ................ 327/538, 327/540–541, 543; 323/315; 455/114.2, 455/295
See application file for complete search history.

(56) References Cited

U.S. PATENT DOCUMENTS

| | | | | |
|---|---|---|---|---|
| 5,572,162 A | * | 11/1996 | Cotreau | 327/552 |
| 6,462,688 B1 | * | 10/2002 | Sutardja | 341/144 |
| 2002/0075076 A1 | * | 6/2002 | Sowlati | 330/296 |
| 2003/0146780 A1 | * | 8/2003 | Chiba et al. | 327/237 |
| 2004/0174199 A1 | * | 9/2004 | Simon | 327/256 |

* cited by examiner

*Primary Examiner*—Quan Tra
(74) *Attorney, Agent, or Firm*—Squire, Sanders & Dempsey L.L.P.

(57) ABSTRACT

Embodiments of the invention enable generation of an IF output signal amplitude that is less sensitive to process voltage and temperature than conventional transmitters.

17 Claims, 3 Drawing Sheets

TRANSMITTER IF SECTION AND METHOD ENABLING IF OUTPUT SIGNAL AMPLITUDE THAT IS LESS SENSITIVE TO PROCESS, VOLTAGE, AND TEMPERATURE

BACKGROUND

1. Technical Field

This invention relates generally to wireless communication systems, and more particularly, but not exclusively, to a transmitter and method that enables the generation of an IF output signal amplitude that is substantially less sensitive to process, voltage and temperature than conventional IF output signals.

2. Description of the Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channel pair (e.g., one of the plurality of radio frequency (RF) carriers of the wireless communication system) and communicate over that channel or channel pair. For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver receives RF signals, removes the RF carrier frequency from the RF signals directly or via one or more intermediate frequency stages, and demodulates the signals in accordance with a particular wireless communication standard to recapture the transmitted data. The transmitter converts data into RF signals by modulating the data to RF carrier in accordance with the particular wireless communication standard and directly or in one or more intermediate frequency stages to produce the RF signals.

Before the up conversion to RF signals, current from a Digital to Analog Converter (DAC) is fed into a Low Pass Filter (LPF) in order to reduce noise and whatever frequency components above the LPF cutoff frequency. Conventionally, the DAC output current is converted to voltage and then goes through the LPF to filter out frequency components above the cutoff frequency. The voltage signal is then converted back to signal current for out conversion mixer. In this way the IF output signal amplitude will experience variations due to process and temperature variations.

Accordingly, a new transmitter IF section architecture and method are presented that experiences substantially less process, voltage and temperature variations.

SUMMARY

Embodiments of the invention form a system and method that enable generation of an IF output signal amplitude that is substantially less sensitive to process, voltage and temperature than conventional IF output signals.

In an embodiment of the invention, the method comprises: receiving an input current; mirroring the input current; converting the received input current to a voltage; filtering the voltage; and converting the filtered voltage into an output current using the mirrored input current.

In another embodiment of the invention, the transmitter incorporates a system comprising a current mirror, a first and second MOSFET, and a filter. The current mirror mirrors an input current. The first MOSFET converts the received input current to a voltage. The filter, which is communicatively coupled to the first MOSFET, filters the voltage. The second MOSFET, which is communicatively coupled to the filter and the current mirror, converts the filtered voltage into an output current using the mirrored input current.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
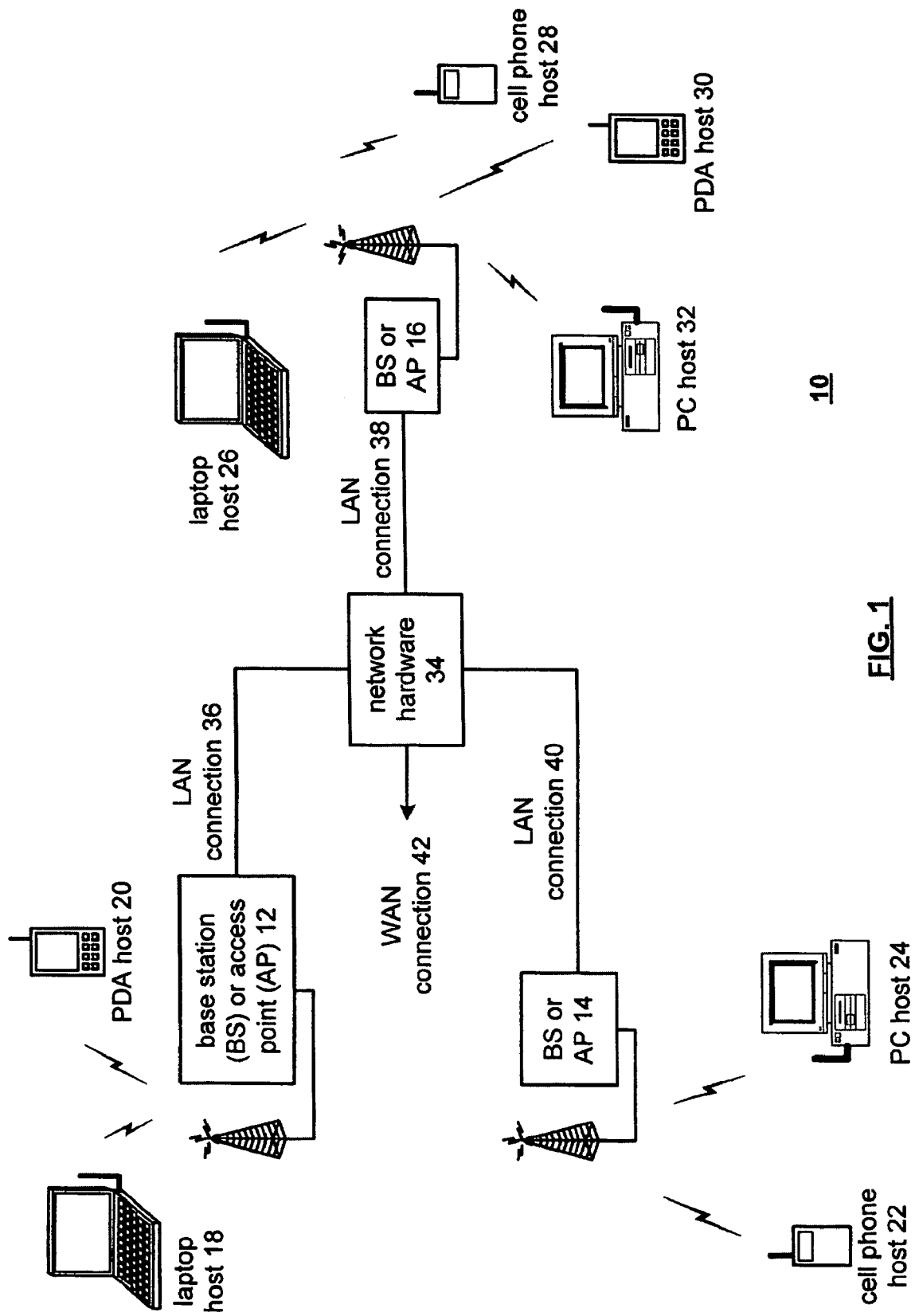
FIG. 1 is a block diagram illustrating a network system according to an embodiment of the present invention.

FIG. 1 is a block diagram illustrating a network system 10 according to an embodiment of the present invention. The system 10 includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12 are operably coupled to the network hardware 34 via local area network connections 36, 38 and 40. The network hardware 34, which may be a router, switch, bridge, modem, system controller, etc. provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a transmitter capable of adjusting power amplifier output power and therefore has characteristics of reduced power requirements, thereby extending the life of an associated power supply.

Figure 2:
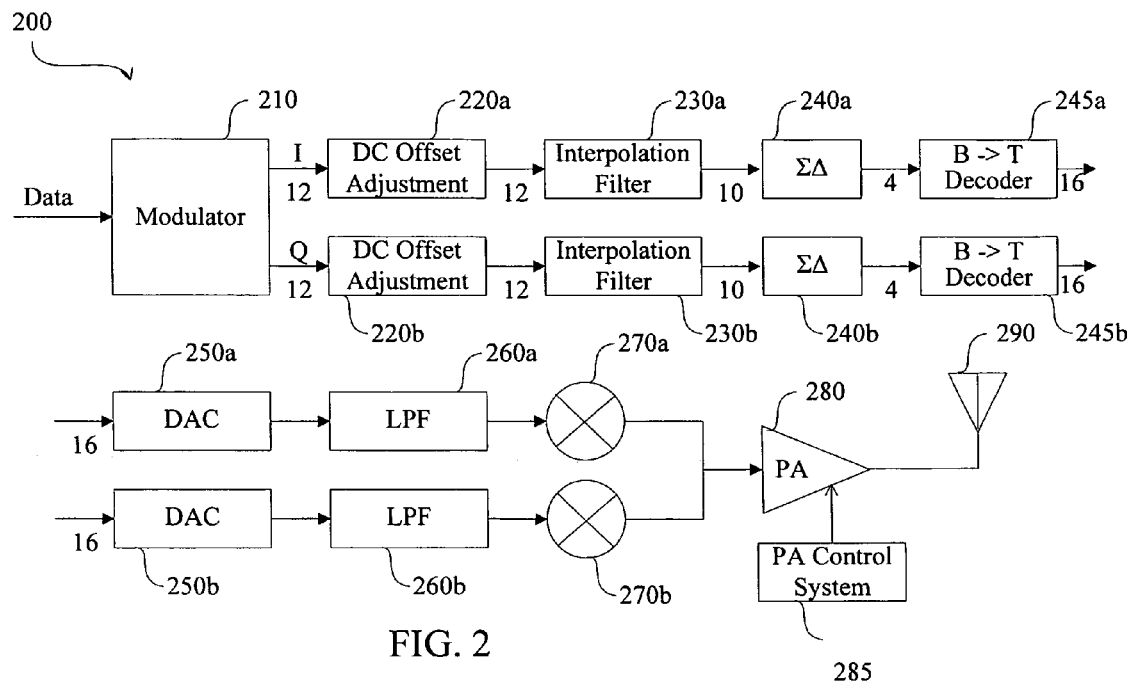
FIG. 2 is a block diagram illustrating a transmitter section according to an embodiment of the present invention.

FIG. 2 is a block diagram illustrating a transmitter section (or portion) 200 according to an embodiment of the present invention. Each wireless device of the network system 10 can include a transmitter portion 200 for transmitting data to other wireless network nodes. The transmitter section 200 includes a modulator 210 communicatively coupled to DC Offset Adjustment Engines 220a and 220b, which are communicatively coupled to Interpolation Filters 230a and 230b respectively. The Interpolation Filters 230a and 230b and communicatively coupled to delta sigma modulators 240a and 240b respectively (also referred to as sigma delta modulators). The delta sigma modulators 240a and 240b are communicatively coupled to binary to thermometer decoders 245a and 245b respectively. The decoders 245a and 245b are communicatively coupled to the DACs 250a and 250b respectively, which are communicatively coupled to low pass filters (LPFs) 260a and 260b. The LPFs 260a and 260b are communicatively coupled to mixers 270a and 270b respectively, which are each communicatively coupled to a power amplifier 280, which is communicatively coupled to an antenna 290. A power amplifier control system 285 is also communicatively coupled to the power amplifier 280.

The modulator 210 receives digital data from a processing component of a wireless device and performs quadrature amplitude modulation on the data. The modulation can include, for example, Gaussian Frequency Shift Keying (GFSK), 4-Phase Shift Keying (PSK), and/or 8-PSK. The modulator 210 provides quadrature outputs. In an embodiment of the invention, the sampling frequency is 12 MHz and output is 12 bits.

For FSK modulation, the I output can be represented as $I=\cos(2\pi f_c t+2\pi f_d 3 v dt)$ and the Q output can be represented as $I=\sin(2\pi f_c t+2\pi f_d 3 v dt)$. For PSK modulation, the I output can be represented as $I=\text{Re}(R(t)e^{j2\pi F f t})$ and the Q output can be represented as $Q=\text{IM}(R(t)e^{j2\pi f f t})$.

The DC offset adjustment engines 220a and 220b adjust the DC offset at the digital domain of the I and Q outputs from the modulator 210. The DC adjustment word length is 11 bits.

The interpolation filters 230a and 230b up sample the output from 12 MHz to 96 MHz. Higher OSR will make the following delta sigma modulation easier. For IF frequency ≴1 MHz, the interpolation filters 230a and 230b filter out the 12 MHz image by more than 80 dBc. For IF of 2 MHz, the interpolation filters 230a and 230b filter out the 12 MHz by more than 60 dBc. Output of the interpolation filters 230a and 230b are 10 bits.

The delta sigma modulators 240a and 240b are second order delta sigma modulators that output 4 bits from a 16 bit input. The delta sigma modulators 240a and 240b also push quantization noise outside the LPF 260a and 260b bandwidth. The sampling frequency of the delta sigma modulators 240a and 240b are each 96 MHz. Input ranges from −2 to 1.75. Depending on control bit settings, incoming input can range from −1 to +1 or from −1.25 to +1.25. The extra range is reserved for signal excursions when modulation is present. With an input range of −1.25 to +1.25 and no modulation, output amplitude will be 5. The binary to thermometer decoders 245a and 245b convert the 4 bit output from delta sigma modulators 240a and 240b to thermometer coding (16 bits) according to Table I. In an embodiment of the invention, the DACs 250a and 250b incorporate the decoders 245a and 245b therein.

TABLE I

| ΔΣ Output | Binary Number | Mag | b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|---|---|---|
| 7 | 0111 | 15 | 0 | 1 | 1 | 1 | 1 | 1 | 1 | 1 | 1 | 1 | 1 | 1 | 1 | 1 | 1 | 1 |
| 6 | 0110 | 14 | 0 | 0 | 1 | 1 | 1 | 1 | 1 | 1 | 1 | 1 | 1 | 1 | 1 | 1 | 1 | 1 |
| 5 | 0101 | 13 | 0 | 0 | 0 | 1 | 1 | 1 | 1 | 1 | 1 | 1 | 1 | 1 | 1 | 1 | 1 | 1 |
| 4 | 0100 | 12 | 0 | 0 | 0 | 0 | 1 | 1 | 1 | 1 | 1 | 1 | 1 | 1 | 1 | 1 | 1 | 1 |
| 3 | 0011 | 11 | 0 | 0 | 0 | 0 | 0 | 1 | 1 | 1 | 1 | 1 | 1 | 1 | 1 | 1 | 1 | 1 |
| 2 | 0010 | 10 | 0 | 0 | 0 | 0 | 0 | 0 | 1 | 1 | 1 | 1 | 1 | 1 | 1 | 1 | 1 | 1 |
| 1 | 0001 | 9 | 0 | 0 | 0 | 0 | 0 | 0 | 0 | 1 | 1 | 1 | 1 | 1 | 1 | 1 | 1 | 1 |
| 0 | 0000 | 8 | 0 | 0 | 0 | 0 | 0 | 0 | 0 | 0 | 1 | 1 | 1 | 1 | 1 | 1 | 1 | 1 |
| −1 | 1111 | 7 | 0 | 0 | 0 | 0 | 0 | 0 | 0 | 0 | 0 | 1 | 1 | 1 | 1 | 1 | 1 | 1 |
| −2 | 1110 | 6 | 0 | 0 | 0 | 0 | 0 | 0 | 0 | 0 | 0 | 0 | 1 | 1 | 1 | 1 | 1 | 1 |
| −3 | 1101 | 5 | 0 | 0 | 0 | 0 | 0 | 0 | 0 | 0 | 0 | 0 | 0 | 1 | 1 | 1 | 1 | 1 |
| −4 | 1100 | 4 | 0 | 0 | 0 | 0 | 0 | 0 | 0 | 0 | 0 | 0 | 0 | 0 | 1 | 1 | 1 | 1 |
| −5 | 1011 | 3 | 0 | 0 | 0 | 0 | 0 | 0 | 0 | 0 | 0 | 0 | 0 | 0 | 0 | 1 | 1 | 1 |
| −6 | 1010 | 2 | 0 | 0 | 0 | 0 | 0 | 0 | 0 | 0 | 0 | 0 | 0 | 0 | 0 | 0 | 1 | 1 |

TABLE I-continued

| ΔΣ Output | Binary Number | Mag | b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|---|---|---|
| −7 | 1001 | 1 | 0 | 0 | 0 | 0 | 0 | 0 | 0 | 0 | 0 | 0 | 0 | 0 | 0 | 0 | 0 | 1 |
| −8 | 1000 | 0 | 0 | 0 | 0 | 0 | 0 | 0 | 0 | 0 | 0 | 0 | 0 | 0 | 0 | 0 | 0 | 0 |

The DACs 250a and 250b use thermometer coding to minimize sampling clock 96 MHz) glitches. The DACs 250a and 250b convert the digital signals to analog signals. The LPFs 260a and 260b receive the analog signals and filter out any glitches to generate a continuous signal and will be discussed further in conjunction with FIG. 3 below. The mixers 270a and 270b convert the analog signals to an RF signal (e.g., 2.4 GHz for Bluetooth). The RF signal is then amplified by the power amplifier 280 and transmitted by the antenna 290.

The power amplifier 280, in an embodiment of the invention, is 200 μm by 0.15 μm and comprises 17 stages (or branches). The power amplifier 280 has a power control capability of 0 dB to −32 dB with a step size of 2 dB. The power amplifier 280 adjusts output power based on input from the power amplifier control system 285.

Figure 3:
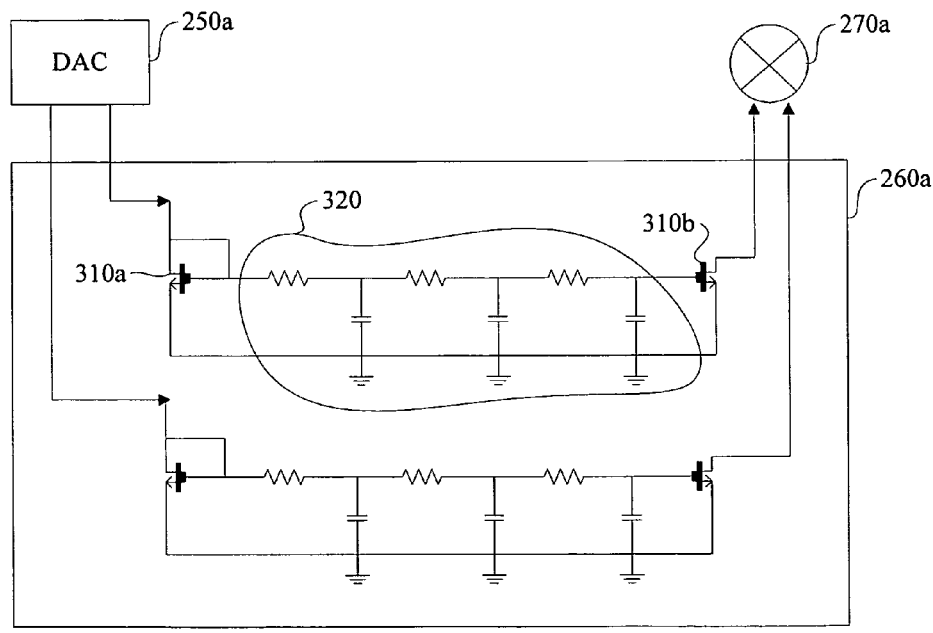
FIG. 3 is a block diagram illustrating a LPF of the transmitter section.

FIG. 3 is a block diagram illustrating the LPF 260a of the transmitter section 200 (FIG. 2). The LPF 260b functions the same as the LPF 260a in an embodiment of the invention. The LPF 260a combines current mirrors with a third order low pass (RC) filter 320. Current from the DAC 250a is fed into the current mirror and the current signal is transformed into a voltage signal at a Metal-Oxide Semiconductor (or Substrate) Field-Effect Transistor (MOSFET) 310a. The third order low pass (RC) filter 320 filters out the clocking glitches (96 MHz), any quantization noise present, and whatever frequency components that are beyond the cutoff frequency. After the filter 320 there is a MOSFET 310b that converts the voltage signals to current signals using an inverse function of the MOSFET 310a using filtered voltage signals and current from the current mirror. For example, if the MOSFET 310a performs the function y=f(x), then the MOSFET 310b performs the function $x=f^{-1}(y)$. For example, the MOSFET 310a input current I is equal to a constant time the square of gate voltage minus a second constant, i.e., $I=k[V_g-V_{th}]^2$. The MOSFET 310a produces $V_g$ from I while the MOSFET 310b produces I from $V_g$ after filtering. Output is then fed into the mixer 270a. Accordingly, the LPF 260a is very linear and signal gain is process independent. DC gain of the LPF 260a is exactly one, e.g., there is no DC offset generated for the LPF 260a.

It will be appreciated by one of ordinary skill in the art that other embodiments of the invention can that the LPF 260a can be modified. For example, a different order filter 320 may be employed. Further, other mechanisms besides MOSFETS 310a and 310b may be used to convert between current and voltage. For example, bipolar devices maybe used in place of the MOSFETS 310a and 310b. Further, any device for converting between voltage and current can be used as long it is not effected by the low pass (RF) filter 320.

Figure 4A:
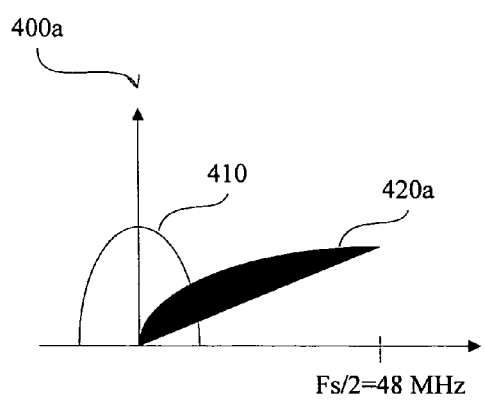
FIG. 4A and FIG. 4B are diagrams illustrating the LPF effect on noise.
Figure 4B:
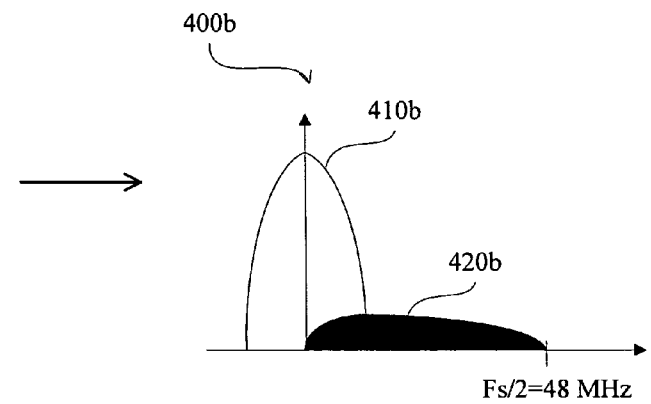

FIG. 4A and FIG. 4B are diagrams illustrating the LPF 260a effect on noise. Delta sigma modulator 240a noise and other noise is filtered out, reshaped, and pushed out of the signal.

Figure 5:
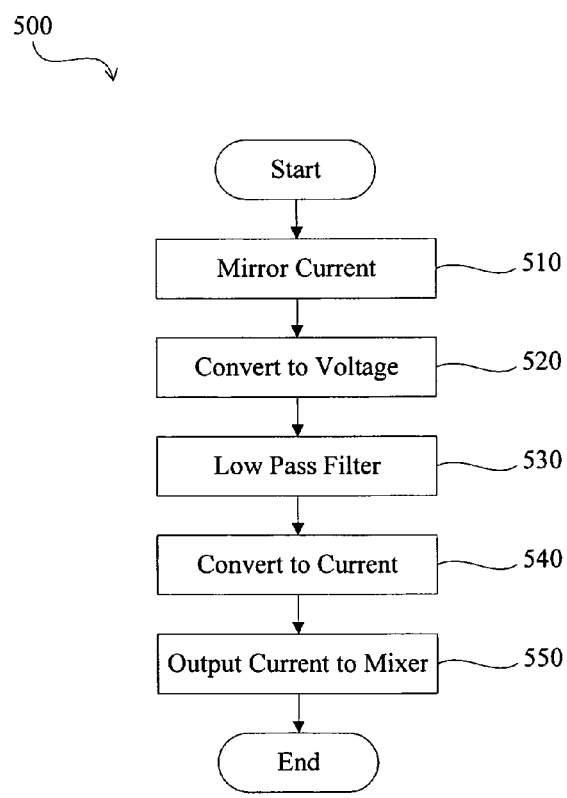
FIG. 5 is a flowchart illustrating a method of filtering.

FIG. 5 is a flowchart illustrating a method 500 of filtering. In an embodiment of the invention, the LPF 260a and/or 260b executes the method 500. First, received current from the B->T Decoder 245a is mirrored (510). The current is then converted (520) to voltage and filtered (530) using a third order low pass RC filter or other type LPF. The filtered voltage is then converted (540) back to current using the mirrored current and output to the mixer 270a. The method 500 then ends.

The foregoing description of the illustrated embodiments of the present invention is by way of example only, and other variations and modifications of the above-described embodiments and methods are possible in light of the foregoing teaching. Components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method, comprising:
   receiving data;
   performing quadrature amplitude modulation on the data and outputting quadrature outputs;
   adjusting a DC offset at a digital domain of the quadrature outputs and generating a digital signal;
   converting the digital signal to an input current using a digital to analog converter;
   mirroring the input current;
   converting the received input current to a voltage;
   filtering the voltage; and
   converting the filtered voltage into an output current using the mirrored input current.

2. The method of claim 1, wherein the filtering is performed by a low pass filter.

3. The method of claim 2, wherein the low pass filter includes a third order RC filter.

4. The method of claim 1, further comprising outputting the output current to a mixer.

5. The method of claim 1, wherein the converting the received input voltage and the converting the filtered voltage are performed by a first and second MOSFET, respectively.

6. The method of claim 5, wherein the second MOSFET is the inverse of the first MOSFET.

7. The method of claim 1, wherein the filtering filters out clocking glitches and quantization noise.

8. The method of claim 1, wherein the filtering yields a DC gain of one.

9. A system, comprising:
   a modulator configured to receive data, to perform quadrature amplitude modulation on the data, and to output quadrature outputs;
   a DC offset adjustment engine configured to adjust a DC offset at a digital domain of the quadrature outputs and generating a digital signal;
   a digital to analog converter configured to convert the digital signal to an input current;
   a current mirror configured to mirror the input current;

a first MOSFET configured to convert the received input current to a voltage;

a filter, communicatively coupled to the first MOSFET, configured to filter the voltage; and a second MOSFET, communicatively coupled to the filter and the current mirror, configured to convert the filtered voltage into an output current using the mirrored input current.

10. The system of claim 9, wherein the filter includes a low pass filter.

11. The system of claim 10, wherein the low pass filter includes a third order RC filter.

12. The system of claim 9, further comprising means for outputting the output current to a mixer, the means communicatively coupled to the second MOSFET.

13. The system of claim 9, wherein the second MOSFET is the inverse of the first MOSFET.

14. The system of claim 9, wherein the low pass filter filters out clocking glitches and quantization noise.

15. The system of claim 9, wherein the low pass filter yields a DC gain of one.

16. A transmitter incorporating the system of claim 9.

17. A system, comprising:

means for receiving data;

means for performing quadrature amplitude modulation on the data and outputting quadrature outputs;

means for adjusting a DC offset at a digital domain of the quadrature outputs and generating a digital signal;

means for converting the digital signal to an input current using a digital to analog converter;

means for receiving the input current from a digital to analog converter;

means for mirroring the input current;

means for converting the received input current to a voltage;

means for filtering the voltage; and means for converting the filtered voltage into an output current using the mirrored input current.

* * * * *